United States Patent
Kornhaas et al.

[11] Patent Number: 6,092,879
[45] Date of Patent: Jul. 25, 2000

[54] BRAKE SYSTEM FOR A MOTOR VEHICLE

[75] Inventors: Robert Kornhaas, Schwieberdingen; Ulrich Gottwick, Stuttgart, both of Germany

[73] Assignee: Robert Bosch GmbH, Stuttgart, Germany

[21] Appl. No.: 08/718,544

[22] PCT Filed: Feb. 28, 1996

[86] PCT No.: PCT/DE96/00333

§ 371 Date: Oct. 9, 1996

§ 102(e) Date: Oct. 9, 1996

[87] PCT Pub. No.: WO96/30243

PCT Pub. Date: Oct. 3, 1996

[30] Foreign Application Priority Data

Mar. 27, 1995 [DE] Germany ............................ 195 11 161

[51] Int. Cl.[7] .................................................. B60T 8/88
[52] U.S. Cl. ........................................... 303/122.04; 303/3
[58] Field of Search .................................. 303/123.09, 3, 303/20, 122.1, 122.12, 122.03, 122.05, 188

[56] References Cited

U.S. PATENT DOCUMENTS

| | | | |
|---|---|---|---|
| 3,764,182 | 10/1973 | Andreyko et al. | 303/21 EB |
| 4,648,662 | 3/1987 | Fennel et al. | 303/92 |
| 4,678,242 | 7/1987 | Belart | 303/122.09 |
| 5,158,343 | 10/1992 | Reichelt et al. | 303/113 SS |
| 5,261,730 | 11/1993 | Steiner et al. | 303/113.4 |
| 5,281,012 | 1/1994 | Binder et al. | 303/113.5 |
| 5,445,444 | 8/1995 | Rump et al. | 303/125 |
| 5,539,641 | 7/1996 | Littlejohn | 303/20 |
| 5,558,415 | 9/1996 | Buschmann et al. | 303/122.09 |

FOREIGN PATENT DOCUMENTS

| | | |
|---|---|---|
| 2192961 | 1/1988 | United Kingdom . |
| 2265195 | 9/1993 | United Kingdom . |

*Primary Examiner*—Matthew C. Graham
*Assistant Examiner*—Devon Krame
*Attorney, Agent, or Firm*—Fulbright & Jaworski, LLP

[57] ABSTRACT

A brake system for a motor vehicle is proposed, which is equipped with an antilock controller and/or electronic braking force distribution control. When a defect occurs, these control systems are turned off only when necessary for safety reasons. When defects of any other type occur, the controls continue to operate on an emergency basis.

23 Claims, 3 Drawing Sheets

BRAKE SYSTEM FOR A MOTOR VEHICLE

STATE OF THE ART

The invention pertains to a brake system for a motor vehicle wherein the ABS and/or the EBV are deactivated when defects in the electronic control system are detected.

Modern brake systems for motor vehicles include not only conventional hydraulic or pneumatic brakes but also supplemental electronic functions such as antilock protection (ABS) and/or electronic braking force distribution (EBV) between the front and rear axles. These supplemental functions assist the driver during the braking process and improve the stability and steerability of the vehicle in braking situations. For safety reasons, measures must be taken to check out the functionality of the electronic control unit which carries out the supplemental functions and also to check out the mechanical and electrical components.

For a hydraulic brake system, for example, it is known from SAE Paper 890970, "Electronic Control Unit of the Sumitomo Electronic Antilock System", that, to find a defect, it is possible to check not only the electronic control unit itself but also the shutdown path, especially the valve relay, as well as the speed sensors, the pressure control valves, and the return pump to see if they are in working order. When a defect is identified, a warning lamp is turned on to inform the driver, and the antilock controller is turned off no later than the end of the current braking process.

A brake system with ABS and EBV is known from WO 94/12377, in which, when a defective condition is recognized, the voltage supply of the individual control valves is turned off by way of a relay. Both the ABS and also the EBV controllers are thus turned off. The rear axle cannot be overbraked, however, because the valves of the rear wheel brakes continue to be supplied with current via separate circuits, and the pressure in the rear axle brakes is limited.

A controller for the distribution of the braking force between the front and rear axles of a motor vehicle is known from DE-OS 41 12 388 (U.S. Pat. No. 5,281,012). In this controller, the rear axle brake pressure is adjusted in such a way that the difference between the speed of the slowest rear wheel and that of the fastest front wheel does not fall below a predetermined value. As a result, an overbraking of the rear axle in the partial braking range is avoided. In addition to the braking force distribution controller, an antilock controller is also provided. No measures to be taken in the event of defects in the electrical or mechanical components are specified.

As a result of the measures indicated above for shutting down the control function of the ABS and EBV controllers in most cases when a defect occurs, unwanted situations can occur during braking operations, because, without the control function, large slip values can occur at the wheels. At large slip values, the wheels are no longer able to transfer lateral guide forces. As a result, the steerability and the stability of the vehicle are lost during these high-slip phases. In addition, locking wheels can be permanently damaged by the intense abrasion which occurs during braking.

It is therefore the task of the invention to provide measures for an antilock controller and/or a braking force distribution controller which avoid the disadvantages mentioned above.

SUMMARY OF THE INVENTION

The method according to the invention increases the availability of the antilock controller and/or of the braking force distribution controller.

It is especially advantageous that, in the presence of nearly any defect outside the control unit, the braking force distribution controller remains active, so that, even in this operating condition, the overbraking of the rear axle is avoided and the stability of the vehicle remains ensured during braking.

In the case of vehicles with hydraulic brake systems, it is therefore possible and advantageous to eliminate hydraulic components such as pressure reducers and/or measures for additional voltage supply to the rear axle brake valves in the event of defects.

The method according to the invention offers particular advantages in several situations, such as in the event of defects in the speed sensors at either a rear wheel or a front wheel; in the event of defects in the actuators which could lead to a loss of braking force at one or both rear wheel brakes or to an unreduced buildup of braking force at a front axle brake; in the event of defects in the return pump; in the event of defects in the shutdown path such as a sticking valve relay; and in the event of insufficient voltage in the vehicle's electrical system.

DESCRIPTION OF THE EXEMPLARY EMBODIMENTS

Figure 1:
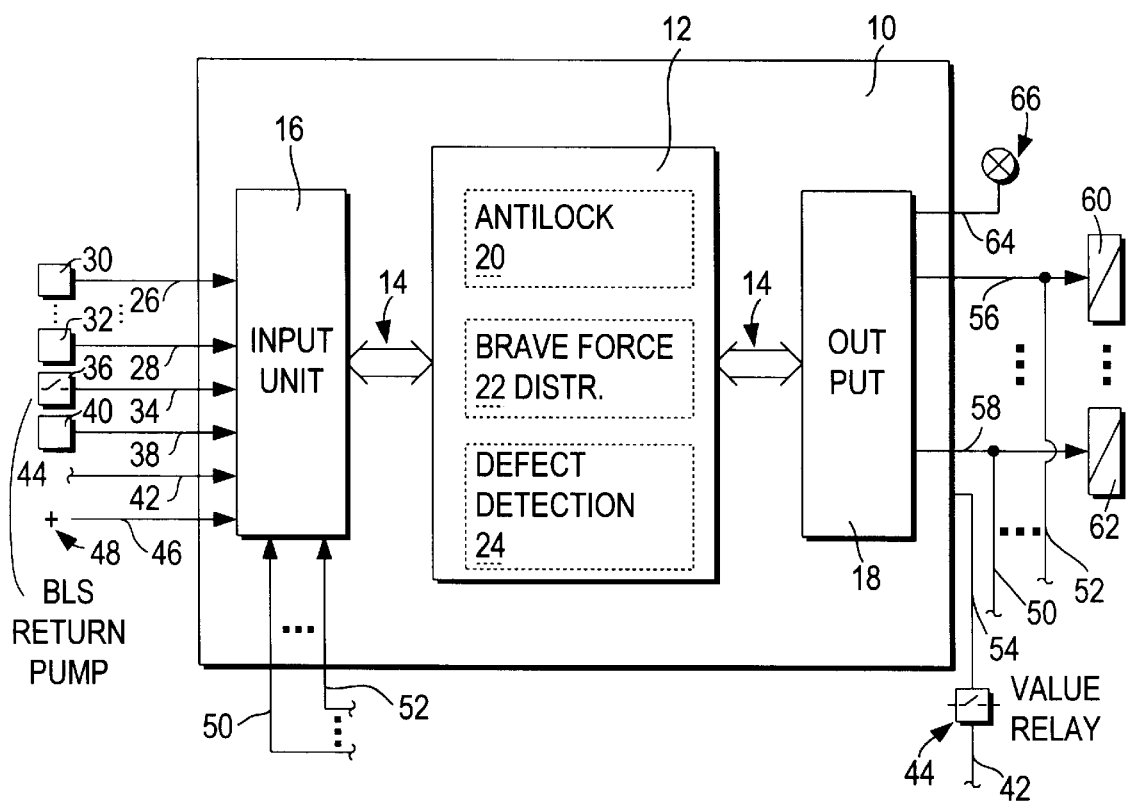
FIG. 1 shows an overall block circuit diagram of the brake system.

FIG. 1 shows an overall block circuit diagram of a brake system, in which the method according to the invention is used. A control unit it is shown, which includes at least one microcomputer 12. This is connected by way of a bus system 14 to an input unit 16 and an output unit 18 for the exchange of information and data. In a preferred exemplary embodiment, microcomputer 12 includes an antilock controller 20, a braking force distribution controller 22, and a defect detection unit 24. The main functions of these controllers and of the defect detection unit are known from the state of the art cited above.

In other advantageous exemplary embodiments, microcomputer 12 includes only antilock controller 20 and defect detection unit 24 or only braking force distribution controller 22 and defect detection unit 24.

Input lines 26–28 from speed sensors 30–32 at the front and rear axles of the vehicle, an input line 34 from a brake pedal switch 36, an input line 38 from a return pump 40 of the brake system, and a line 42 from a valve relay 44 are connected to input unit 16. Via lines 38 and 42 suitable potentials of the corresponding components or defect data are transmitted for the purpose of monitoring. An input line 46 connects input unit 16 to a voltage supply 48. In addition, lines 50–52, which transmit the signal values necessary for monitoring the inlet and outlet valves, are also connected to the input unit. A first output line 54 leads from output unit 18 of the control unit to valve relay 44; output lines 56–58 lead to actuators 60–62 of the individual wheel brakes; and at least one additional output line 64 leads to at least one warning lamp 66.

When the brake system is operating under normal conditions, the antilock controller releases the brake when at least one of the wheels is starting to lock by driving the associated actuators in a defined manner. If the case of hydraulic or pneumatic brake systems, these actuators are understood to be, for example, the inlet and outlet valves. In the preferred exemplary embodiment, the tendency to lock is recognized on the basis of the deviation between the speed of the wheel in question and a reference speed formed on the basis of the speeds of all the wheels. Before this so-called "ABS" case occurs, it is ensured by the braking force distribution controller that the rear axle brake is not overbraked, that is, that the wheels of the rear axle do not lock before the wheels of the front axle. This is accomplished in the preferred exemplary embodiment in accordance with the previously cited state of the art. Then, by the operation of the actuators of the corresponding rear axle wheel brakes, the rear axle braking force is adjusted in such a way that the slowest rear wheel turns more slowly by a predetermined difference value than the fastest front wheel. In this way, the rear wheels are prevented from entering an operating range in whey they would start to lock. Thus a limitation is imposed on the rear wheel braking force; this limitation, even in the partial braking range, represents a deviation from the braking force distribution between the front and rear axles predetermined by the brake system, a deviation which prevents the wheels of the rear axle from locking.

The defect detection unit monitors the microcomputer and the other components of control unit 10 to see if they are working order; it also checks the working order of the external components, especially speed sensors 30–32, brake light switch 36, valve relay 44 return pump 40, and actuators 60–62. In the preferred exemplary embodiment, these defect monitoring measures are implemented by methods known in and of themselves. When a defect situation is recognized, microcomputer 12 turns on warning lamp 66 to inform the driver. In addition, as will be described below, the antilock controller and/or the braking force distribution controller are either completely deactivated (braking being carried out in conventional mode from then on), partially deactivated, or kept fully active. This also applies to the case of insufficient voltage in the vehicle's electrical system. Defect detection unit 24 detects an undervoltage situation by comparing the system voltage transmitted via line 26 with predetermined limit values. Undervoltage is recognized when the supply voltage, which normally has a value of 12 volts, drops into a range of less than 10 and more than 5 volts. Below 5 volts, the system concludes that the voltage supply has failed.

The defect detection unit localizes the defect which has occurred and then decides in accordance with the method according to the invention which of the control functions will continue to be carried out in what manner in spite of the defect. As a result, a situation in which the antilock controller and the braking force distribution controller are both shut down completely in the event of a defect is avoided; the availability of the control system is increased, and the operating reliability of the vehicle is improved. Thus the advantageous effects of the control functions remain available to the driver even in most defect situations, even though slight losses of function and/or losses of comfort may have to be tolerated in certain cases.

In a preferred exemplary embodiment, the signal from a speed sensor on a rear wheel is not evaluated if the sensor is defective. Instead, the signal of the speed sensor on the second rear wheel, which is functioning properly, is evaluated for the sake of the antilock and braking force distribution control. The defective signal is thus overwritten by the non-defective signal during the processing of the speed data. Although the loss of data can lead to a decrease in the quality of the control, the availability of the controller is still guaranteed.

In the case of a defect in a speed sensor at a front wheel, the antilock controller remains active within the framework of an emergency operating mode, in which the estimated vehicle velocity is assumed to apply to the corresponding front wheel, and the actual rotational speed data of this front wheel is ignored when the reference velocity is being calculated.

In the case of defects in the actuators at the rear axle, i.e., defects which lead to a loss of the braking action of a rear axle brake, the braking force distribution controller and the antilock controller continue to function without change. A defect of this type occurs, for example, when, in the case of a hydraulic or pneumatic brake system, the corresponding inlet valve is driven continuously with current as a result of a short circuit and thus blocks the controlled input of pressure to the rear wheel brake. The advantage of this measure is to be seen in that the continued operation of the controller results in greater lateral guidance than would be present after a complete shutdown, even though the braking performance suffers to a slight degree.

When defects occur in the area of the actuators of a front axle brake, at this brake, it has been found advantageous to allow the antilock controller to continue to operate, under exclusion of this front wheel brake, and also to allow the braking force distribution controller to continue to operate unchanged. Defects of this type are present, for example, when, in the case of a hydraulic or pneumatic brake system, the inlet valve can no longer be actuated because of a crack in the line or a short-circuit and thus the driver can feed unlimited pressure to the front wheel brake.

In the case of vehicles with a closed hydraulic brake system, it is possible for a defect to occur in the return pump. In the case of a defect such as this, the antilock controller should be turned off for safety reasons. A defective return pump can no longer pump off the pressure emptied into the storage chamber after the pressure has been released from the associated wheel brakes during ABS control. The result could therefore be a braking action at the wheel brakes which could not be released. Because the emptying of the storage chamber can no longer be counted on, it is therefore necessary in the presence of this defect to shut down the antilock controller. In contrast, the braking force distribution controller can continue to operate. Because the process of distributing the braking force involves essentially the closing of the inlet valves to limit the pressure in the rear wheel brakes, this function can be implemented even after the return pump has failed. It is also still possible for pressure-release actuations to be implemented at the rear wheel brakes. At the end of the control phase, i.e., when the brake pedal no longer being actuated, the corresponding outlet valve is then briefly opened, and in this way the escaping pressure is returned to the brake circuit.

It is evident on the basis of what has been said above that, in the case of hydraulic or pneumatic brake systems, the continued operation of the braking force distribution controller, as opposed to that of the antilock controller, is advantageous in any situation involving a defect in an outlet valve. Because the process of distributing the braking forces involves essentially the actuation of the inlet valves to limit the inlet pressure specified by the driver, the inability to actuate the outlet valves or their continuous actuation does not play a significant role with respect to the ability of the braking force distribution system to function.

Another possible situation with a defect pertains to the defective behavior of the relay or semiconductor element which for safety reasons drives the power supply of the actuators. It is true that the inability to cut off the power supply is system defect of which the driver should be informed by the actuation of a warning lamp, but the functionality of the antilock controller and of the braking force distribution controller is not negatively affected by it. In the case of defect such as this, these functions therefore continue to be actively implemented.

The same is true in situations involving defects in the parking brake switch or other components or signals used only to improve functionality.

If the electrical system has insufficient voltage, the braking force distribution controller will continue to the operate actively, whereas the antilock controller will not.

If an internal defect is detected in the control unit, that is, a defect in the microcomputer or in the input and output unit, it is no longer possible to ensure the reliable operation of the brake system. In this case, therefore, both controllers are turned off.

The method according to the invention described above is illustrated in the following flow charts of FIGS. 2a and 2b.

Figure 2A:
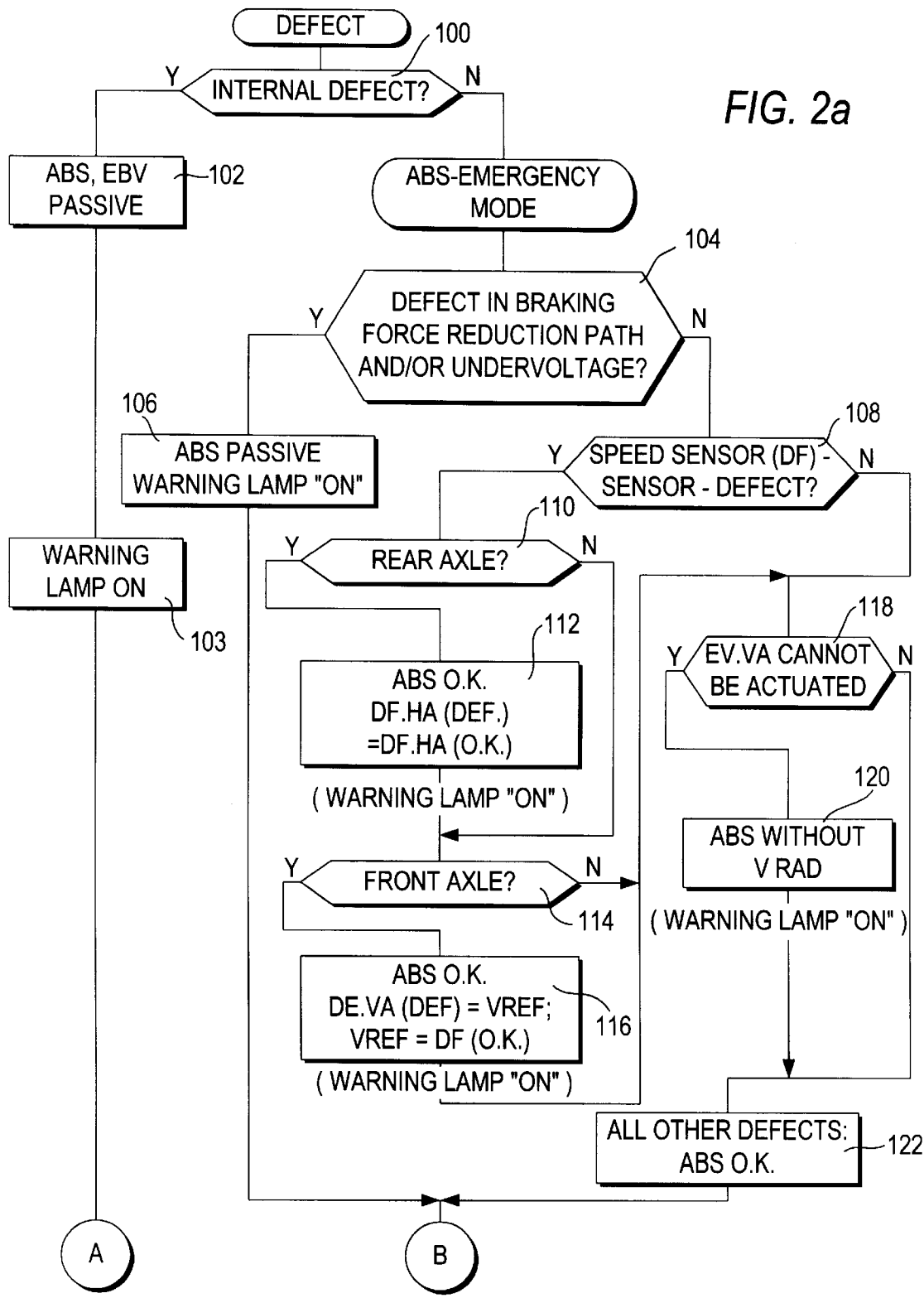
FIG. 2 shows a flow chart, which illustrates a program about how a decision is reached concerning the implementation of ABS and/or EBV control.
Figure 2B:
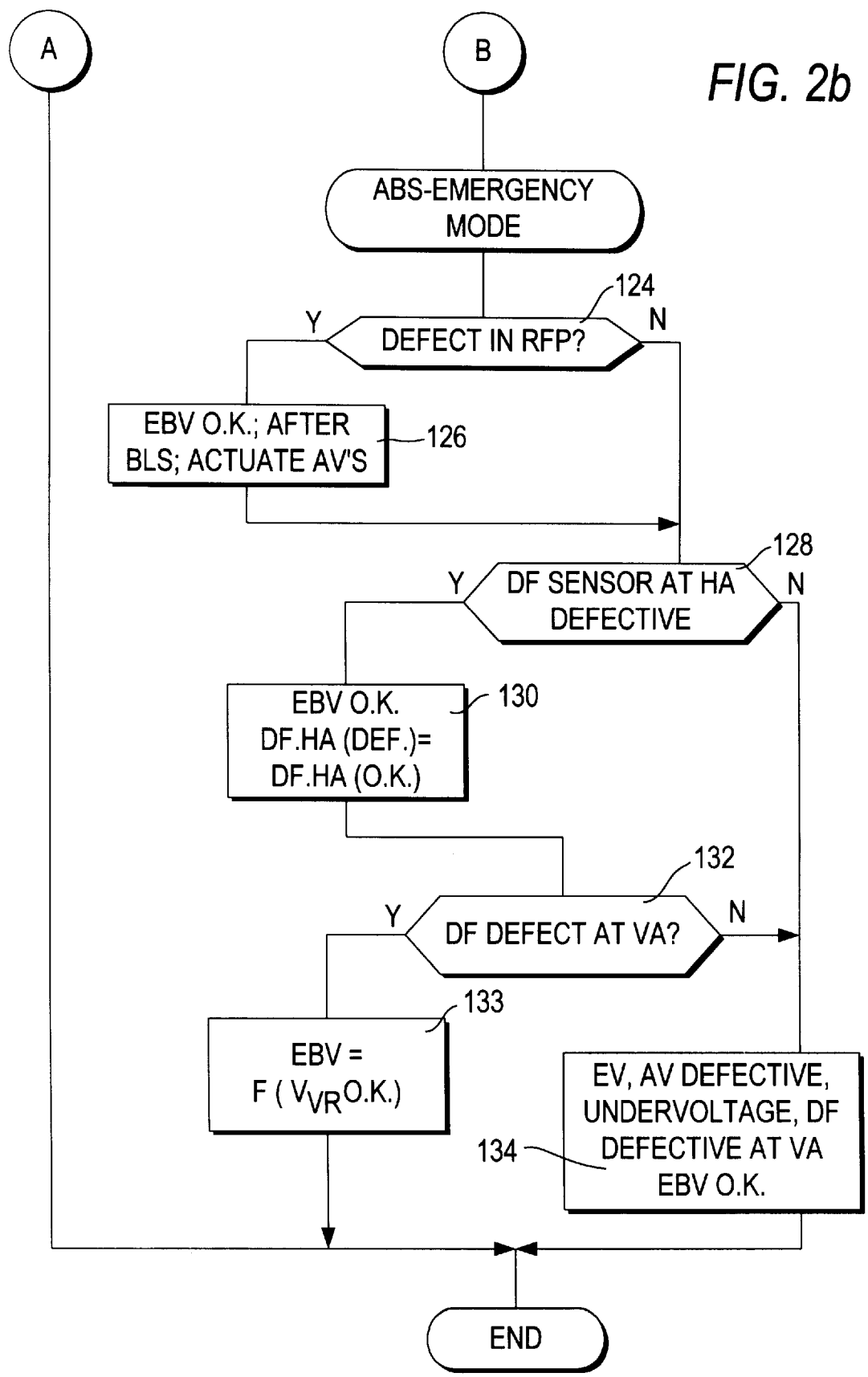

The subprograms shown in FIGS. 2a and 2b are initiated when at least one defect in the brake system has been recognized by defect detection unit 24. Once the subprogram has started, it asks in step 100 whether or not the defect detected by unit 24 is an internal defect in the brake system, i.e., whether it is, for example, a defect in the area of the microcomputer or in the input/output units or a power failure, etc. If this is the case, then in step 102 both the antilock controller (ABS) and the braking force distribution controller (EBV) are turned off. The continuation of these functions in the presence of internal defects of this type could lead to unwanted operating situations. After step 102, the warning lamp is actuated (103), and the subprogram terminates.

If step 100 finds that there is no internal defect, the program branches to another subprogram, which decides on the emergency operation of the antilock controller, depending on the type of defect which has been identified.

In the first question step 104, the program checks to see whether the defect detection unit has detected at least one defect in the braking force reduction path, which, in the case of hydraulic brake systems, therefore, could be a defect in the return pump or in at least one of the outlet valves. It also checks to see if an undervoltage situation is present. In the answer is yes to either question, the antilock controller is switched to passive mode in step 106 and the warning lamp is turned on. After step 106 the program continues with the subprogram for determining the emergency operation of the braking force distribution controller according to FIG. 2b.

If it has been found in step 104 that none of the defects cited has occurred, then in the following question step 108 the program checks to see whether or not a defect has been found in one of the wheel speed sensors. If one has been found, the program asks in step 110 whether or not the defect has occurred at a rear wheel of the vehicle. If yes, the antilock controller is kept active in step 112, but the rear wheel affected by the defect is controlled in correspondence with the wheel speed signal of the rear wheel not affected by the defect, and the defective signal is not evaluated. In addition, in the event of a defect, the warning lamp is turned on. Then, in step 114, the program checks to see whether or not the defect is present at a front wheel speed sensor. If this is so, then in step 116 the antilock controller is kept active, but the wheel speed signal of the front wheel affected by the defect is replaced by the signal of the estimated reference speed $V_{ref}$, and the warning lamp is turned on. The reference speed is calculated here only on the basis of the speed signals not affected by the defect. This measure serves to ensure that braking force can be built up without reduction at the front wheel in question. Then, as after step 114, the program checks in step 118 to see whether the defect which has been detected means that one of the inlet valves at the front wheels cannot be actuated. If this is the case, then in step 120 the antilock controller is kept partially active; the part of the controller which is supposed to control the front wheel affected by the defect is turned off. This leads to a reduction in the functionality of the antilock controller, but because the remaining front wheel is prevented from locking by the antilock controller, the stability of the vehicle during a braking operation is much better than it would be after a total shutdown. In addition, the warning lamp is also turned on in step 120. After step 120 or after a negative decision in step 119, step 122 keeps the antilock controller active without restriction in the presence of any other type of defect such as a sticking valve relay or a defective brake light switch, etc., for as long as the disadvantages of limited function are outweighed by the advantages of increased availability.

It should be noted here that a defect in the speed sensors at all the wheels of one axle, a defect in an actuator at the front axle which makes it impossible to increase the braking force, and a defect in an actuator which makes it impossible to limit the buildup of braking force at both rear wheel brakes are all evaluated as internal defects, which means that the antilock controller and the EBV controller are switched to passive mode in step 102 of the program. In this sense, the method described above applies only to individual defects, not double or multiple defects.

After the emergency operating mode of the antilock controller has been examined in the event of a defect, that is, after step 122 or after step 109, the program continues with the subprogram shown in FIG. 2b to determine the emergency operating mode of the braking force distribution controller.

For hydraulic brake systems, the program checks in step 124 to see whether or not a defect is present in the return pump. If a defect is found, the braking force distribution controller is kept active in step 126, but in addition the outlet valves of the wheel brakes are actuated briefly to release the pressure after the driver is finished actuating the brake pedal. As a result of this measure, it is possible, when braking force distribution control is initiated again, not only to limit the rear wheel brake pressure but also to reduce the pressure at the rear wheel brakes, even if the return pump is defective.

After step 126 or after step 124, the program asks in step 128 whether or not a speed sensor defect is present at a rear wheel. If a defect is found, then in step 130 the braking force distribution controller is kept active in a manner similar to that of step 116; and, for the purpose of control, only the signal sent by a properly operating speed sensor of a rear wheel is used as an input variable. If there is no sensor defect at a rear wheel, then the program checks in step 132 to see whether or not there is a defect in a front wheel speed sensor. If there is a defect, the EBV controller in step 133 operates in analogy to the ABS controller on the basis of the defect-free front wheel speed signal. If the answer to step 232 is "no", the braking force distribution controller is kept active without change (step 134) in the presence of all other defects such as defects in the actuators at the front or rear axle brakes, in the presence of undervoltage, or in the case of a defect in the brake light switch or in the valve relay, as long as these defects have not been evaluated as internal defects in accordance with step 100. It should be noted here that, in the case of a defect in a rear wheel actuator which makes it impossible to build up the braking force at a rear wheel brake, the braking performance can suffer, but a gain of lateral guidance offsets this deterioration. After step 133, 134, or 102, the subprogram terminates and is repeated when necessary.

In summary it can be said that the method according to the invention significantly increases the availability of antilock controllers and/or braking force distribution controllers, because the controllers are turned off only in situations where a passive condition is absolutely necessary for safety reasons. In all other cases, the controller functions continue to be kept active; a certain functional deterioration is unavoidable, but this is more then compensated by the stabilizing effect of the controller functions which remains.

It should also be pointed out that, when several different types of defects occur, the corresponding measures are applied simultaneously.

In the preferred exemplary embodiment, an EBV controller such as that described in the previously cited state of the art is used, namely a controller which compares the difference between the speed of the slowest rear wheel and the fastest front wheel with a predetermined value and adjusts the rear axle braking force in such a way that the predetermined difference is not exceeded.

In other exemplary embodiments, the method according to the invention also offers the above-cited advantages in conjunction with other types of EBV controllers. For example, an EBV controller can be provided which detects the axle loads and, as a function of the detected axle load values, determines a desired deceleration or desired pressure value.

The ABS or EBV control is therefore deactivated only when defects are present which can lead to a critical deterioration in the reliability of the braking action, of the braking stability, and/or of the steerability. These include defects within the control unit, in the actuators which affect the braking force and/or, in the voltage supply. In the case of individual defects which do not lead to any critical deterioration in the reliability of the braking action, of the braking stability, and/or of the steerability, however, the antilock controller remains active at least to a limited extent.

In the preferred exemplary embodiment, the method according to the invention is used within the scope of a hydraulic brake system. In other advantageous variants, the method according to the invention has also proved suitable for electrohydraulic, electromechanical, pneumatic, and electropneumatic brake systems with ABS function and electronic braking force distribution.

What is claimed is:

1. Brake system for a motor vehicle, with at least one control unit, which includes at least an antilock controller and a defect detection unit, the defect detection unit recognizing both defects within the control unit and also defects in the components and connections outside the control unit, and in its voltage supply, characterized in that the defect detection unit, as a function of the defective conditions which it has recognized, initiates a complete deactivation of the antilock controller, allows it to remain active with limited functionality, or allows it to remain active with complete functionality, complete deactivation occurring only in the case of defects which can lead to a critical deterioration in the reliability of the braking action, of the braking stability, and/or of the steerability, such defects including those within the control unit, in actuators which adjust the braking force, and/or in the voltage supply, whereas, in the case of individual defects which do not lead to a critical deterioration in the reliability of the braking action, of the braking stability, and/or of the steerability, the antilock controller remains active at least to a limited extent.

2. Braking system according to claim 1, characterized in that, when there is a defect in a speed sensor at a rear wheel, the antilock controller continues to operate on the basis of a substitute signal.

3. Brake system according to claim 1, characterized in that the substitute signal is the speed signal of properly functioning speed sensor.

4. Brake system according to claim 1, characterized in that when there is a defect in a speed sensor of a front wheel, the antilock controller continues to operate on the basis of a substitute signal.

5. Brake system according to claim 4, characterized in that the substitute signal is the estimated driving speed, this being determined on the basis of the signals of the properly functioning speed sensors of the vehicle.

6. Brake system according to claim 1, characterized in that the antilock controller is switched to a passive state when all of speed sensors of rear or front wheel fail; when there are defects in an actuator at the front wheels which makes it impossible to build up braking force at a front wheel brake; and when there are defects in at least one actuator which makes it impossible to reduce the build up of braking force at the brakes of both rear wheels.

7. Brake system according to claim 1, characterized in that, when there are defects in an actuator which make it impossible to reduce the buildup of braking force at a front wheel, the antilock controller remains active regardless of the defect.

8. Brake system for a motor vehicle, with at least one control unit, which includes at least a controller for the braking force distribution between rear and front wheel brakes and a defect detection unit, the defect detection unit recognizing defects within the control unit and in the components and connections outside the control unit and in the voltage supply of the control unit, characterized in that the braking force distribution controller is turned off when there are defects within the control unit and in that, otherwise, in the case of individual defects, it continues to operate to at least a limited extent.

9. Brake system according to claim 8, characterized in that, in a hydraulic brake system, the braking force distribution controller remains active when there is a defect in a return pump, where, in the case of pressure release actuations, a corresponding outlet valve is kept open at the end of the braking force distribution control for as long as a brake pedal is not being actuated.

10. Brake system according to claim 8, characterized in that, when there are defects in actuators at the front wheel brakes or at the rear wheel brakes which make it impossible to reduce the braking force or when there is insufficient voltage, the braking force distribution controller remains active.

11. Brake system according to claim 8, characterized in that, for the control of the braking force distribution between the front and rear wheel brakes, the rear wheel braking force is adjusted in such a way that the difference between the slowest rear wheel and the fastest front wheel does not exceed a predetermined value.

12. Braking system according to claim 9, wherein, when there is a defect in a speed sensor a rear wheel, an antilock controller continues to operate on the basis of a substitute signal.

13. Brake system according to claim 9, wherein a substitute signal is the speed signal of a properly functioning speed sensor.

14. Brake system according to claim 9, wherein when there is a defect in a speed sensor of a front wheel, an antilock controller continues to operate on the basis of a substitute signal.

15. Brake system according to claim 9, wherein a substitute signal is the estimated driving speed, this being determined on the basis of the signals of a properly functioning speed sensors of the vehicle.

16. Method for controlling a brake system of a motor vehicle having brakes, actuators for said brakes, an antilock controller for said actuators, and a voltage supply for said antilock controller, said method comprising detecting defects in at least one of said antilock controller, said actuators, and said voltage supply, determining the extent to which said defects affect reliability of at least one of braking action, braking stability, and steerability, and deactivating said antilock controller to an extent which depends upon the extent to which said defects affect said reliability of at least one of braking action, braking stability, and steerability.

17. Method for controlling a brake system of a motor vehicle having front and rear axles, brakes at each axle, actuators for said brakes, a braking force distribution controller for the front and rear axle brakes, and a voltage supply for a antilock controller, said method comprising detecting defects in at least one of said braking force distribution controller, said actuators, and said voltage supply, turning off the braking force distribution controller when there is a defect in the braking force distribution controller, and deactivating the braking force distribution controller to a limited extent in the case of defects detected outside of said braking force distribution controller.

18. Brake system for a motor vehicle, with at least one control unit, which includes at least an antilock controller and a defect detection unit, said defect detection unit recognizing at least one of the following defects:

defects within the control unit, defects in a braking force reduction path, defects in a wheel speed sensor, defects in the voltage supply of the control unit, and defects in a braking force increase path, wherein the defect detection unit shuts off said controller when a defect belonging to a first group of defects is detected, said first group including defects which lead to a critical deterioration in the reliability of the braking action, of the braking stability and/or of the steerability and comprising at least one of the defects within the control unit, the defects in the braking force reduction path and the defects in the voltage supply of the control unit, whereby the defect detection unit keeps the controller active at least to a limited extent when a defect belonging to a second group is detected, said second group including defects which do not lead to such critical deterioration and comprise at least one of the defects in a wheel speed sensor and defects in the braking force increase path.

19. Brake system for a motor vehicle, with at least one control unit, which includes at least a braking force distribution controller and a defect detection unit, the defect detection unit recognizing at least one of the following defects:

defects within the control unit, defects in a pump of the brake system defects in a wheel speed sensor wherein said defects shut off the controller when a defect belonging to a first group is detected, said first group including defects which lead to a critical deterioration in the reliability of the braking action, of the braking stability and/or of the steerability and comprising the defects within the control unit, whereby the defect detection unit keeps the controller active at least to a limited extent when a defect belonging to a second group is detected, said second group including defects which do not lead to such critical deterioration comprising at least one of the defects in a wheel speed sensor and defects in the pump.

20. Method for controlling a brake system of a motor vehicle, having brakes, actuators for said brakes, an antilock controller and a voltage supply, said method comprising;

detecting at least one of the following defects:

defects within the control unit, defects in a braking force reduction path, defects in a wheel speed sensor, defects in the voltage supply of the control unit, and defects in a braking force increase path, so as to shut off the antilock controller when a defect is detected belonging to a first group of defects which lead to a critical deterioration in the reliability of the braking action, of the braking stability and/or of the steerability comprising at least one of the defects within the control unit, the defects in the braking force reduction path and the defects in the voltage supply of the control unit, and so as to keep the controller active at least to a limited extent when a defect belonging to a second group including defects which do not lead to such critical deterioration is detected, comprising at least one of the defects in a wheel speed sensor and defects in the braking force increase path.

21. Method for controlling a brake system of a motor vehicle, having brakes, actuators for said brakes, abraking force distribution controller, and a voltage supply, said method comprising, detecting at least one of the following defects:

defects within the control unit, defects in a pump of the brake system defects in a wheel speed sensor so as to shut off the controller when a defect is detected belonging to a first group of defects which lead to a critical deterioration in the reliability of the braking action, of the braking stability and/or of the steerability comprising defects within the control unit, and so as to keep the controller active at least to a limited extent when a defect belonging to a second group including defects which do not lead to such critical deterioration is detected comprising at least one of the defects in a wheel speed sensor and defects in the pump.

22. Brake system for a motor vehicle, with at least one control unit, which includes at least an antilock controller and a defect detection unit, the defect detection unit recognizing both defects within the control unit as well as defects in the components and connections outside the control unit, and in its voltage supply, wherein the defect detection unit, as a function of the defective conditions which it has recognized, initiates a complete deactivation of the antilock controller, allows it to remain active with limited functionality, or allows it to remain active with complete functionality, complete deactivation occurring only in the case of defects which can lead to a critical deterioration in the reliability of the braking action, of the braking stability, and/or of the steerability, such defects including those within the control unit, in actuators which adjust at least the braking force, or the voltage supply, whereas, in the case of individual effects which do not lead to a critical deterioration in the reliability of the braking action, of the braking stability, and/or of the steerability, the antilock controller remains active at least to a limited extent, such that the antilock controller is switched to a passive state when all of speed sensors of an axle fail; when there are defects in an actuator at a front axle which makes it impossible to build up braking force at a front wheel brake; and when there are defects in at least one actuator which makes it impossible to reduce the build up of braking force at the brakes of both real wheels, and whereby in a hydraulic brake system, a braking force distribution controller remains active when there is a defect in a return pump, such that in the case of pressure release actuations, a corresponding outlet valve is kept upon at the end of the braking force distribution control for as long as a brake pedal is not being actuated.

23. Brake system for a motor vehicle, with at least one control unit, which includes at least an antilock controller and a defect detection unit, the defect detection unit recognizing both defects within the control unit as well as defects in the components and connections outside the control unit, and in its voltage supply, wherein the defect detection unit, as a function of the defective conditions which it has recognized, initiates a complete deactivation of the antilock controller, allows it to remain active with limited functionality, or allows it to remain active with complete functionality, complete deactivation occurring only in the case of defects which can lead to a critical deterioration in the reliability of the braking action, of the braking stability, and/or of the steerability, such defects including those within the control unit, in actuators which adjust at least the braking force, or the voltage supply, whereas, in the case of individual effects which do not lead to a critical deterioration in the reliability of the braking action, of the braking stability, and/or of the steerability, the antilock controller remains active at least to a limited extent such that, when there are defects in an actuator which make it impossible to reduce the buildup of braking force at a front wheel, the antilock controller remains active regardless of the defect, and whereby in hydraulic brake system, a braking force distribution controller remains active when there is a defect in a return pump, such that in the case of pressure release actuations, a corresponding outlet valve is kept upon at the end of the braking force distribution control for as long as a brake pedal is not being actuated.

* * * * *

UNITED STATES PATENT AND TRADEMARK OFFICE
CERTIFICATE OF CORRECTION

PATENT NO. : 6,092,879
DATED : Jul. 25, 2000
INVENTOR(S) : Kornhaas et al

It is certified that error appears in the above-indentified patent and that said Letters Patent is hereby corrected as shown below:

In the <u>cover page</u>, in the section entitled <u>Assistant Examiner</u>, change "Krame" to -- Kramer --.
In <u>column 2, line 36</u>, after "unit" insert -- 10 --.
In <u>column 6, line 17</u>, change "119" change -- 118 --.
In <u>column 6, line 35</u>, change "109" change -- 106 --.
In <u>column 6, line 60</u>, change "232" change -- 132 --.
In <u>column 10, line 42</u>, change "abraking" change -- a braking --.
In <u>column 11, line 19</u>, change "real" change -- rear --.

Signed and Sealed this

Seventeenth Day of April, 2001

Attest:

NICHOLAS P. GODICI

Attesting Officer

Acting Director of the United States Patent and Trademark Office